(12) United States Patent
Kaidi

(10) Patent No.: US 11,489,813 B2
(45) Date of Patent: Nov. 1, 2022

(54) SYSTEMS AND METHODS FOR DETECTING AND DYNAMICALLY RATE LIMITING ACCOUNT DISCOVERY AND TAKEOVER ATTEMPTS

(71) Applicant: PayPal, Inc., San Jose, CA (US)

(72) Inventor: George Chen Kaidi, Singapore (SG)

(73) Assignee: PAYPAL, INC., San Jose, CA (US)

( * ) Notice: Subject to any disclaimer, the term of this patent is extended or adjusted under 35 U.S.C. 154(b) by 171 days.

(21) Appl. No.: 16/877,738

(22) Filed: May 19, 2020

(65) Prior Publication Data

US 2021/0367923 A1   Nov. 25, 2021

(51) Int. Cl.
*H04L 29/06* (2006.01)
*H04L 9/40* (2022.01)

(52) U.S. Cl.
CPC ...... *H04L 63/0236* (2013.01); *H04L 63/0263* (2013.01); *H04L 63/1425* (2013.01); *H04L 63/1466* (2013.01)

(58) Field of Classification Search
CPC ............. H04L 63/0236; H04L 63/0263; H04L 63/1425; H04L 63/1466
See application file for complete search history.

(56) References Cited

U.S. PATENT DOCUMENTS

| | | | | |
|---|---|---|---|---|
| 6,662,230 | B1 * | 12/2003 | Eichstaedt | G06F 21/62 709/217 |
| 9,699,203 | B1 * | 7/2017 | Yang | H04L 63/1416 |
| 2006/0089905 | A1 * | 4/2006 | Song | G06Q 20/10 705/39 |
| 2008/0117813 | A1 * | 5/2008 | Hwang | H04L 47/10 370/230 |
| 2010/0131668 | A1 * | 5/2010 | Kamath | H04L 47/32 709/233 |
| 2013/0090115 | A1 * | 4/2013 | Deivasigamani | H04W 48/20 455/434 |
| 2013/0133062 | A1 * | 5/2013 | Boss | G06F 21/46 726/18 |

* cited by examiner

*Primary Examiner* — Vance M Little

(74) *Attorney, Agent, or Firm* — Haynes and Boone, LLP

(57) ABSTRACT

Methods and systems are presented for detecting and dynamically rate limiting unauthorized attempts to obtain user account information from an online service provider. An online system is configured with a request rate limit and a list of user identifiers associated with accounts at risk of being compromised. The system receives requests, each associated with a user identifier, from one or more devices. The system determines what amount of user identifiers associated with the requests match user identifiers on the list over a period of time. If the amount meets or exceeds a threshold, the system reduces the request rate limit for devices that made a request associated with user identifiers matching those on the list.

20 Claims, 7 Drawing Sheets

SYSTEMS AND METHODS FOR DETECTING AND DYNAMICALLY RATE LIMITING ACCOUNT DISCOVERY AND TAKEOVER ATTEMPTS

BACKGROUND

The present specification generally relates to online account security, and more specifically, to detecting and preventing automated attacks against a service provider designed to gain access to user accounts according to various embodiments of the disclosure.

RELATED ART

Illicitly obtained credentials for accessing service provider websites, particularly account information pertaining to providers of financial services (e.g., payment or banking services), can be extraordinarily valuable. Malicious actors may log in to a user's account using the credentials and steal funds directly from a user's account, or they may sell the credentials to other malicious actors. Often, a user may reuse credentials created for one service provider with other service providers. For example, a user may use the same e-mail address and password (or similar passwords with slight variations) for a banking service, a social networking service, and an e-mail service. A security breach resulting in the dissemination of user account information from any of those services may allow an attacker to access any one of the other services using the same credentials. Service providers may provide some protection to users in the form of two-factor authentication, where a code sent to a user's phone or e-mail address after a login attempt must be entered by the user before accessing the service, but the e-mail account itself may be compromised, and techniques exist for intercepting text messages intended for a user (e.g., SIM swapping and cloning).

Malicious actors may automate attempts to gain access to a user's account at the service provider. For example, an attacker may write a script or application to repeatedly attempt to log in to the service provider's website using a list of account credentials (e.g., e-mail addresses or usernames and passwords) obtained from a data breach at a different service provider. Similarly, the attacker may attempt to identify which e-mail addresses from the list is associated with an account at the service provider using a script that runs entries in the list against an endpoint at the service provider (e.g., an endpoint for creating a new account). The attacker may then use the identified e-mail addresses as part of a subsequent attack. Service providers may attempt to protect against such attacks by applying a rate limit specifying an allowable number of requests over a period of time from a user before the user is blocked from further requests. Attackers, however, may discover the rate limit and configure their scripts to limit the number of attempts and stay under the rate limit. Furthermore, rate limits may negatively impact legitimate users. For example, users at a large institution may share a single public-facing IP address, and may innocently trigger the application of the rate limit based on their combined activity. A single malicious actor at the institution may also trigger the application of the limit to innocent users at the same institution sharing an IP address. Thus, there is a need for developing improved methods of detecting attacks of the kind described and reduce their likelihood of success while reducing the impact of any attack mitigation measures on legitimate users of a service.

Figure 1:
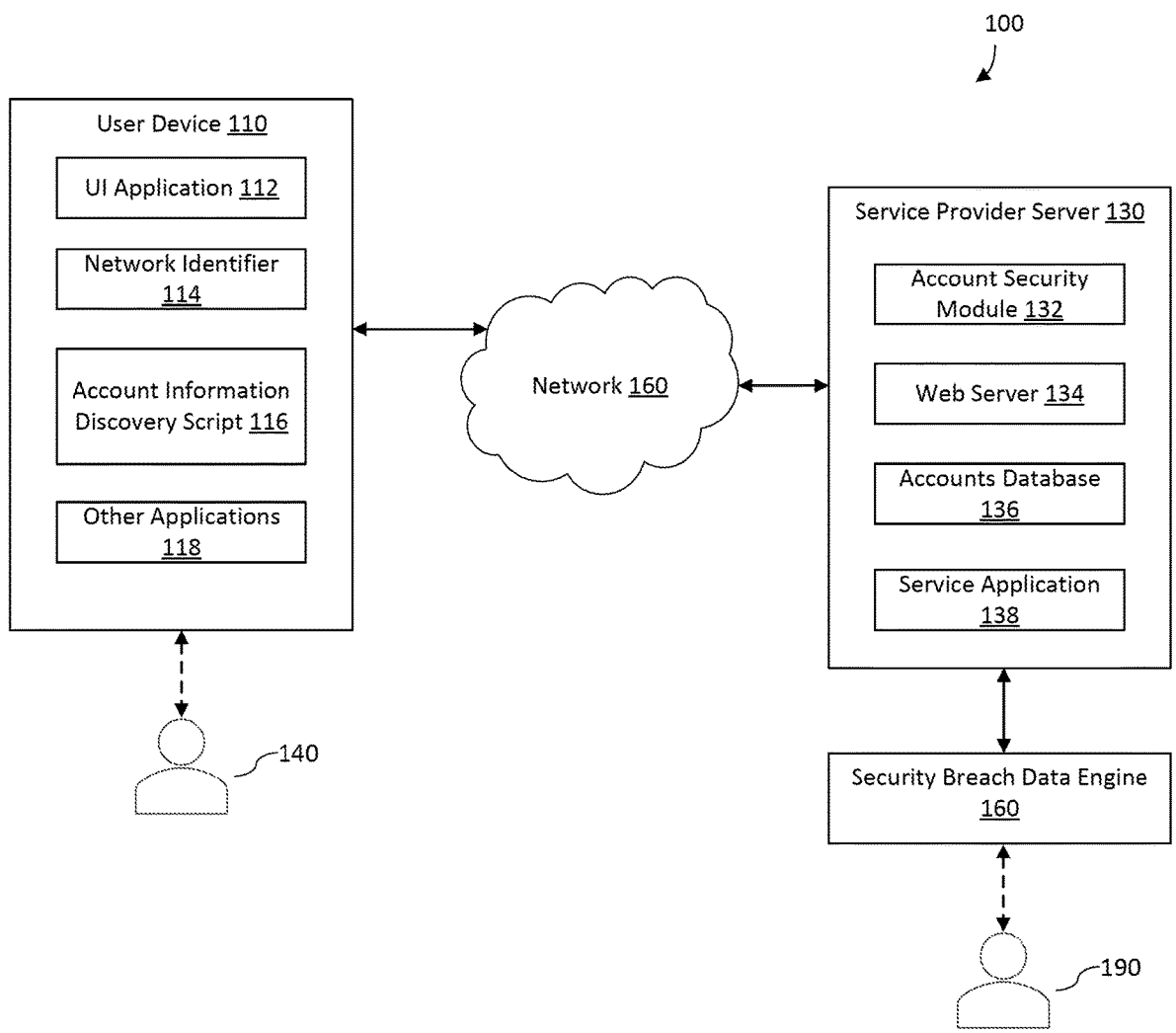
FIG. 1 is a block diagram illustrating an account security system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for detecting and preventing attempts to gain access to user accounts at a service provider. As discussed above, a service provider may become subject to attacks designed to gain access to user accounts based on data obtained from a security breach at an unrelated service provider, or attacks designed to discover user account information (e.g., e-mail addresses or usernames). As an example, consider two unrelated service providers—a financial services provider (e.g., a bank or payment system), and a service provider operating an online discussion forum—each requiring that a user create an account using an e-mail address and a password. A malicious actor may be able to obtain the account information of all users with accounts on the online discussion forum. For example, the malicious actor may discover an unprotected or poorly protected database on a server running the online discussion forum. The database may contain e-mail addresses and passwords (or password hashes, some of which may be used in combination with other information to determine passwords) for users of the discussion forum. The malicious actor may distribute the compromised database on the internet, where any number of other malicious actors may access it. An innocent user may have an account with both the online discussion forum and the financial services provider, and may have used the same e-mail address and password as his credentials for both services. Anyone in possession of the compromised list of e-mail addresses and passwords for the online discussion forum would then be in possession of the user's login credentials for the financial services provider. With the user's credentials, an attacker may try to gain access to the user's account on the website of the financial services provider to steal funds (e.g., directly by transferring the funds, or by making fraudulent purchases using the funds) or sell the user's credentials to other malicious actors. However, the attacker may not yet know the user has an account with financial services provider, or that the user shared the same e-mail address and password between both services.

To discover if a user has an account with the financial services provider, or to attempt to log in to the user's account using the credentials obtained from the security breach at the online discussion forum, an attacker may randomly select pairs of usernames and passwords from the compromised database. As this would prove inefficient, an attacker may instead automate the process by creating an application or script that extracts the credentials from the compromised database and attempts to log in to the financial services provider's website using a login endpoint. Alternately, the attacker may simply try to determine which users from the compromised database also have accounts with the financial services provider, without actually attempting to log in to any accounts. For example, the attacker may write a script that sends requests to an endpoint at the service provider for creating new accounts. Each request may include an e-mail address extracted from the compromised database. The endpoint may be configured to provide some indication that an account already exists with the e-mail address included in the request, either explicitly (through a message indicating so) or implicitly (through differences in the response to the request based on whether an account associated with the e-mail address already exists).

The financial services provider's website may be configured to protect against such attacks by instituting a security policy including a rate limit on the number of requests from a user over a period of time at an endpoint. The rate limit may indicate that if the number of requests to the account creation endpoint meets or exceeds a limit, further attempts from the IP address at which the request originated may be blocked. For example, the rate limit may be set to 10 requests per minute. If the attacker's script issued 10 requests to the endpoint in under a minute, further requests to the endpoint from the IP address associated with the attacker's device would be blocked for a period of time. The attacker may be able to discover the rate limit by trial and error (e.g., by increasing or decreasing the rate at which requests are sent until requests are blocked or no longer blocked). Once the attacker discovers the rate limit is 10 requests/minute, the attacker could configure his script to issue 9 requests/minute without being blocked. An attacker may further circumvent such protections by distributing the requests among multiple IP addresses (e.g., from different devices, or from multiple network adapters at a single device). For example, the attacker may run 4 instances of the script, each issuing requests to the endpoint from a different IP address. So long as the number of attempts from each IP address does not exceed 10 attempts/minute, none of the subsequent requests would be blocked, i.e., the attacker could issue up to 9 requests per minute per IP address (36 requests per minute total) and not be blocked. Further compounding the problem for the service provider is that legitimate requests may run afoul of the rate limit policy and block innocent users from accessing the service. For example, multiple users at a University building may share a single public-facing IP address, and 10 users each accessing the endpoint within a minute would cause the IP address to be blocked, preventing any other users from accessing the endpoint for the block period. An overly aggressive rate limit adversely impacts legitimate users, but a lenient rate limit increases the number of requests an attacker may make without being blocked. Accordingly, embodiments of the present disclosure allow a service provider to detect that an attack is under way, dynamically reduce the rate limit under such circumstances, make the rate limit harder to detect, block attackers who repeatedly exceed the rate limit for longer periods of time, and block attackers who repeatedly approach—but don't exceed—the rate limit.

In some embodiments, an account security system may maintain a list (e.g., in a database) of pre-identified user identifiers. The user identifiers may have been published as the result of a security breach, or may be associated with activities that may indicate a security risk. For example, the list may be populated with user identifiers (e.g., e-mail addresses or usernames) found in comprised account databases distributed online. The list may be periodically updated whenever a new collection of comprised account information is found. For example, a process may extract all of the user identifiers from a compromised database and insert them into the list, along with an indication of the source of the user identifiers (e.g., the security breach from which each user identifier was extracted).

In some embodiments, an account security system may determine a request rate limit and receive a number of requests at one or more endpoints. Each request may be associated with a user identifier, which may be an e-mail address or username potentially associated with an account on the system. For example, an endpoint for creating new accounts may receive a request with a user identifier, where the user identifier is to be used to create a new account. Each request may be logged in one or more log files (e.g., one log file per endpoint, or one log file shared among multiple endpoints). Each entry in the log file may include the IP address from which the request originated, a timestamp, the user identifier associated with the request, and the endpoint at which the attempt was received. Periodically, the system may determine how many of the requests included user identifiers on the list of pre-identified user identifiers. For example, the system may extract some or all of the user identifiers from the log files (e.g., using regular expressions), group the user identifiers by endpoint, and search the list of pre-identified user identifiers to determine how many user identifiers associated with the requests received at each endpoint match user identifiers on the list. The determination may be made at specific time intervals, on a rolling basis. For example, the determination may be made every minute, extracting user identifiers from the log files associated with requests received in the previous 10 minutes. The system may then determine whether the amount of matching user identifiers received at an endpoint meets or exceeds a threshold associated with a particular source of pre-identified user identifiers (e.g., user identifiers obtained as the result of a specific breach). For example, assume that any number of requests are received at an account creation endpoint, the list of pre-identified user identifiers includes user identifiers from a list of 200 compromised accounts obtained from a security breach at a social network website, and 400 compromised accounts obtained from a breach at a banking website. Assume also that the threshold is 5%, the interval over which the determination is made is 10 minutes, and the determination is made every minute. Every minute, the account security system may determine if during the 10-minute interval preceding the current time, the requests received at the account creation endpoint included 5% or more of the pre-identified user identifiers from the social network website breach (i.e. 10), or 5% or more of the pre-identified user identifiers from the banking website (i.e., 20) the threshold would be met. The threshold may also be defined with respect to pre-identified user identifiers from multiple breaches, or with respect to all pre-identified user identifiers. For example, in some instances, the threshold could be met if requests received at the account creation endpoint included 5% or more of the combined pre-identified user identifiers from the social network website breach and the banking website breach, or if they included 5% or more of the combined pre-identified user identifiers from any breach. The threshold may be defined as a percentage of pre-identified user identifiers from a source as in the previous example, or as a fixed number of pre-identified user identifiers from a source. The threshold may vary between different sources, for example, based on the severity of the breach or the number of pre-identified user identifiers identified with the breach. In some embodiments, the threshold may be met by considering all requests received during the interval across any number of endpoints. For example, continuing the example above, if during the 10-minute interval, the combined number of requests received any number of endpoints (not just one endpoint) included 5% or more of the pre-identified user identifiers from the social network website breach (i.e. 10), or 5% or more of the pre-identified user identifiers from the banking website (i.e., 20) the threshold would be met. In some embodiments, the threshold may be defined with respect to all pre-identified user identifiers, regardless of the source.

If the system detects that the threshold is met or exceeded (potentially indicating that an attack may be underway), the system may reduce the request rate limit for a period of time. The request rate limit may also be reduced in response to the system detecting other potential abuses (e.g., a distributed denial of service attack). In some embodiments, the request rate limit may be reduced for any IP address from which a request associated with a pre-identified user identifier originated. The reduced request rate limit may apply for any requests from the IP address to any endpoint, or only for requests from the IP address to the endpoint or endpoints where requests associated with pre-identified user identifiers were received. The request rate limit may also be reduced for any IP address that sends a request related to a pre-identified user identifier to an endpoint after the threshold has been met or exceeded. The request rate limit may also be reduced for all requests to an endpoint (regardless of IP address) at which a request associated with a pre-identified user identifier was received. Additionally (or instead), further requests from those IP addresses may be blocked for a period of time (the block period). In some embodiments, the block period may be increased in response to determining that the threshold has been met or exceeded.

Comparing user identifiers associated with requests to those on the pre-identified list of user identifiers and lowering the request rate limit in response improves account security when an attack may be under way, without unnecessarily burdening legitimate users with overly restrictive rate limits at other times.

In some embodiments, the system may increase or change (e.g., randomly) the duration of a block period for an IP address each time the number of requests originating at the IP address meets or exceeds the rate limit. If the system detects that the number of requests originating from an IP address meets or exceeds the rate limit, the system may block requests from the IP address for a first period of time (the first block period). Once the first block period expires, the system will again accept requests from the IP address. If the number of requests from the IP address again meets or exceeds the rate limit, the system may block the IP address for a second period of time (the second block period) longer than the first period of time. The system may continue to increase the duration of each subsequent block period (e.g., exponentially, or by a fixed amount) each time the rate limit is met or exceeded, reducing the number of requests an attacker may make over time. In some embodiments, the duration of the block period for the IP address may reset to its initial value after a period of time elapses (the rate reset period) where requests from the IP address do not meet or exceed the rate limit. In addition, as with the duration of the block period, the duration of the rate reset period may be increased every time the IP address is blocked. For example, assume the initial block period duration is 10 minutes, and the rate reset period is 15 minutes. If requests from the IP address exceed the rate limit for a first time, the IP address may be blocked for 10 minutes, and unblocked when the 10 minutes expire. If within 15 minutes (the rate reset period) of the IP address being unblocked, requests from the IP address again exceed the rate limit, the user will be blocked for a period of time longer than 10 minutes (e.g., 12 minutes), and the reset period may be extended (e.g., to 20 minutes). After 12 minutes, the IP address will be unblocked. If, within 20 minutes (the rate reset period), requests from the IP address again meet or exceed the rate limit, requests from the IP address will be blocked for a period of time longer than 12 minutes, and the rate reset period will increase above 20 minutes. If, however, requests from the IP address remain under the rate limit for 20 minutes (the rate reset period) after the IP address is unblocked, the block period for any subsequent block may be reset to the initial value of 10 minutes, and the rate reset period may be reset to its initial value of 15 minutes.

In some embodiments, the system may randomize the rate limit or the period of time for which a rate limit is in effect, making it difficult for an attacker to determine the effective rate limit and optimize an attack script accordingly. The system may determine an upper rate limit bound and a lower rate limit bound, defining the highest and lowest possible values of the rate limit, and randomly select a value for the rate limit between the two bounds. The system may similarly determine an upper rate limit duration bound and a lower rate limit duration bound for a rate limit duration, and randomly select a value for the rate limit duration between the two bounds. The rate limit may be in effect for the rate limit duration. At the end of the rate limit duration, the system may select a new rate limit at random between the upper and lower rate limit bounds. The system may also select a new rate limit duration between the upper and lower rate limit duration bounds.

In some embodiments, the system may implement a flagging policy that detects potential abuse from an IP address, even when the number of requests from the IP address has not met or exceeded the request rate limit, for example, when an attacker has configured his script to keep the number of requests below the rate limit (intentionally or coincidentally). The system may determine a flag-rate limit defining the number of requests over a period of time at or which an IP address will flagged. The flag rate limit may be lower than the request rate limit. The system may also determine a flag limit, defining the number of times an IP address may be flagged before being blocked. If the number of requests from an IP address over a period of time meets or exceeds the flag rate limit, the IP address may be flagged. If the IP address is flagged a number of times equal to or in excess of the flag limit, the IP address may be blocked for a period of time.

FIG. 1 illustrates an online system 100 within which the account security system may be implemented according to one embodiment of the disclosure. The online system 100 includes a service provider server 130 associated with a service provider and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the service provider server 130 over the network 160. For example, the user 140 may use the user device 110 to log in to a user account with the service provider to access account services or conduct electronic transactions (e.g., account transfers or payments, purchase goods and/or services, sales of goods and/or services, receive payments of the sale, etc.) with the service provider server 130. Furthermore, the user 140 represented here may be a natural person, a group of people, a community, and/or a business entity. Examples of business entities include merchant sites, resource information sites, utility sites, real estate management sites, social networking sites, etc., which offer various items for purchase and process payments for the purchases.

The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct electronic transactions (e.g., selling, shopping, purchasing, bidding, etc.) with the service provider server 130 over the network 160. In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in one embodiment, may include at least one network identifier 114, which may be, for example, an IP address (e.g., an IPv4 or IPv6 address) assigned to a network adapter at the user device. In various implementations, the network identifier 114 may be passed with a request to the service provider system 130 via the network 160, and the identifier 114 may be used by the service provider system 130 to associate the user with a particular user account (e.g., and a particular profile) maintained by the service provider system 130.

The user device 110 may, in some embodiments, particularly when in the control of a malicious actor, include an account information discovery script 116. The script 116 may be an application designed to discover account information about users from the service provider server 130. For example, the script 116 may repeatedly issue requests through the network 160 to endpoints at the service provider server 130. The requests may be login requests containing user credentials (e.g., e-mail addresses or usernames, and passwords), or other types of request designed to determine whether an e-mail address or username is associated with an account on the service provider server 130. The user credentials may be obtained from lists (e.g., databases) of compromised accounts following a security breach. The script 116 may be a console application, an application with a graphical user interface, or a script designed to run in the UI Application 112 (e.g., in a browser). The script 116 may include features designed to circumvent security measures at the service provider server. For example, the script 116 may include features to detect and stay under a request rate limit, or disconnect and reconnect to the network 160 to obtain a new network identifier periodically. The script 116 may also coordinate with scripts 116 on other user devices 110, each with their own network identifier 114, to issue requests to the service provider server using different sets of credentials from the list of compromised accounts. Instances of the script 116 may also run independently on any number of user devices 116.

The user device 110, in various embodiments, may include other applications 118 as may be desired in one or more embodiments of the present disclosure to provide additional features available to the user 140. For example, the applications 118 may include security applications for implementing client-side security features, programmatic client applications for interfacing with appropriate application programming interfaces (APIs) over the network 160, and/or various other types of generally known programs and/or software applications. In still other examples, the other applications 118 may interface with the user interface application 112 for improved efficiency and convenience.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

Even though only one user device 110 is shown in FIG. 1, it has been contemplated that one or more user devices (each similar to user device 110) may be communicatively coupled with the service provider server 130 via the network 160 within the system 100.

The service provider server 130, in one embodiment, may be maintained by an online service provider, which may provide services (e.g., selling of merchandise processing, performing electronic transactions, etc.). As such, the service provider server 130 may include a service application 138, which may be adapted to interact with the user devices (such as the user device 110) over the network 160 to facilitate the searching, selection, purchase, payment of items, and/or other services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page, and is configured to serve the log-in page to users for logging into user accounts of the users to access various service provided by the service provider server 130. The web server 134 may also include other webpages associated with the different services offered by the service provider server 130. As a result, a user (e.g., the user 140) may access a user account associated with the user and access various services offered by the service provider server 130, by generating HTTP requests directed at the service provider server 130. The Web Server 134 may also contain numerous web service endpoints configured to respond to particular types of requests. For example, the web server 134 may include an endpoint for login requests, an endpoint for new account requests, and an endpoint for account balance information requests.

The service provider server 130, in one embodiment, may be configured to maintain one or more user accounts (e.g., a buyer account, a seller account, etc.) in an account database 136, each of which may include account information associated with one or more users (e.g., the user 140 associated with user device 110). For example, account information may include private financial information of users and merchants, such as one or more account numbers, passwords, credit card information, banking information, digital wallets used, transaction history, or other types of financial information. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130 (e.g., in the accounts database 136), and the user may have credentials to authenticate or verify identity with the service provider server 130. Credentials may include an e-mail address or username, and a password. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

The service provider server 130 may also include an account security module 132. The account security module 132 may establish and adjust rate limits and rate limit durations for requests to different endpoints, block users 140 (e.g., based on their network identifiers 114) for meeting or exceeding rate limits, adjust the duration of block periods, and/or flag and block users 140 for exceeding a flag rate limit a number of times even while remaining under the request rate limit. As disclosed herein, the account security module may determine that a number (or a percentage) of requests received over a period of time are associated with user identifiers (e.g., e-mail addresses or usernames) that have been pre-identified as possibly being compromised. The user identifiers may have been pre-identified after being found in a list or database of compromised accounts resulting from a security breach at a different service provider. For example, the account security module may extract some or all user identifiers associated with access requests received over a period of time (e.g., from access logs). The account security module 132 may search a list (e.g., a database or other collection of data) of pre-identified user identifiers for the extracted user identifiers and determine an amount of matching user identifiers. The account security module 132 may determine that the amount meets or exceeds a threshold and reduce the request rate limit in response. The account security module 132 may reduce the request rate limit for every network identifier 114 (e.g., IP address) from which a request with a pre-identified user identifier originated, and for network identifiers 114 which send requests with a pre-identified user identifier after the threshold has been met or exceeded. The account security module 132 may also reduce the request rate limit for an entire endpoint (i.e., for all requests received at the endpoint, regardless of network identifier 114) at which requests including pre-identified user identifiers were received. The account security module 132 may also increase the period of time for which requests are blocked in response to the threshold being met.

In an embodiment, the account security module 132 may include or communicate with a security breach data engine 160. The security breach data engine 160 may use a database or other storage mechanism to store user identifiers which may have been compromised on other services or otherwise suspected of being compromised. For example, the security breach data engine 160 may process a database or other collection of user credentials published online as a result of a security breach, extract any user identifiers (e.g., e-mail addresses or usernames) from the database, and store them for use by the account security module 132 as described herein. The security breach data engine 160 may periodically update the stored user identifiers. For example, a new collection of potentially compromised credentials may be provided to the security breach data engine 160 by a human operator 190, or the security breach data engine may be configured to locate and attempt to parse credentials published as part of a security breach (e.g., by monitoring sites known to publish data breaches).

Figure 2:
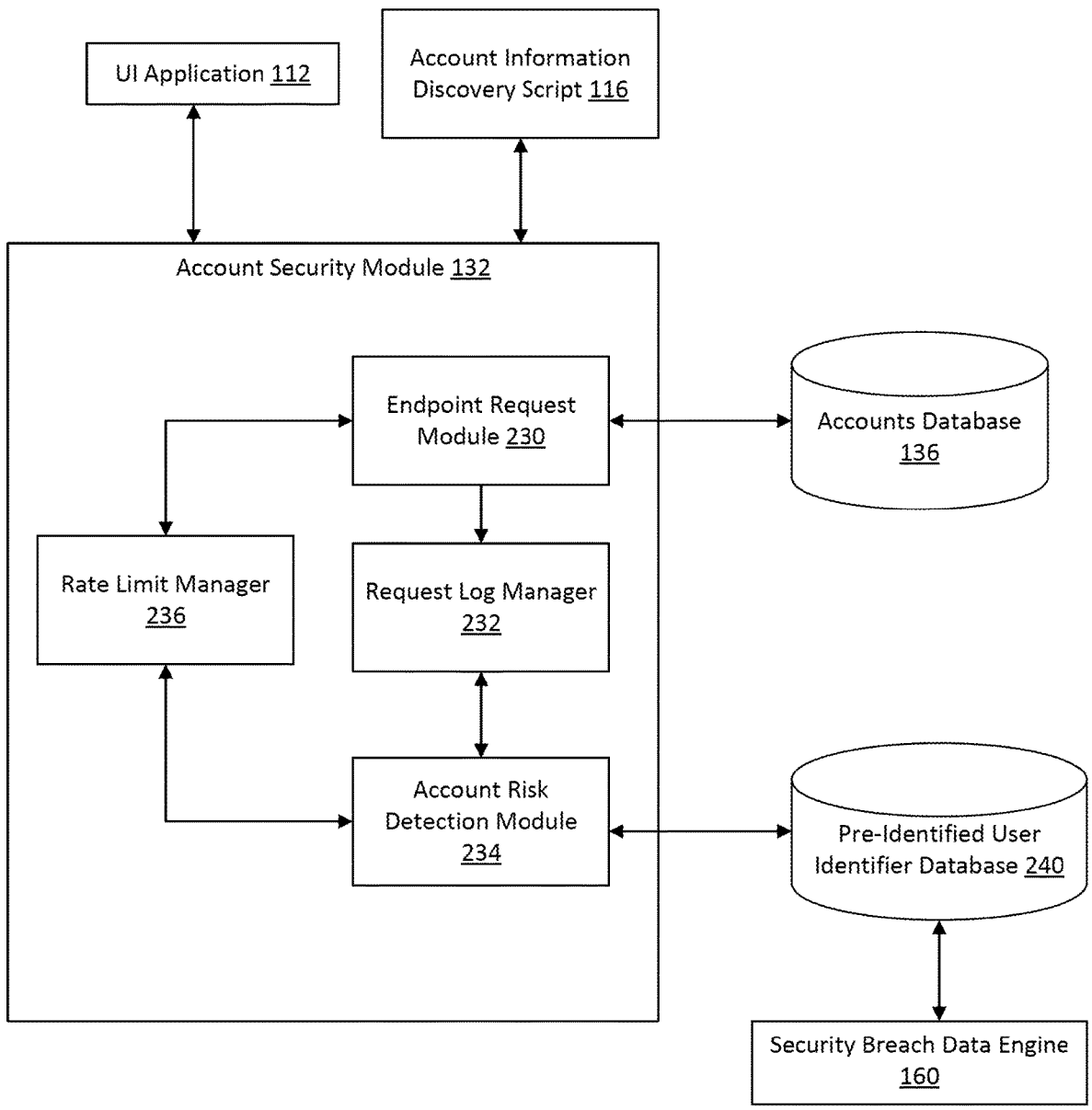
FIG. 2 is a block diagram illustrating an account security module according to an embodiment of the present disclosure.

FIG. 2 illustrates a block diagram of the account security module 132 according to an embodiment of the disclosure. The account security module 132 includes an endpoint request module 230, a request log manager 232, an account risk detection module 234, and a rate limit manager 236. The endpoint request module 230 may receive and respond to requests from the UI application 112, which may be, for example, a web browser or an app on a mobile device. Requests may include login requests, account creation requests, balance inquiry requests, transaction requests and more. The endpoint request module 230 may rely on the accounts database 136 to validate login attempts or confirm user credentials before responding to a request relating to a user account. The accounts database 136 may be part of the account security module 132, or external to the account security module 132. For example, when the endpoint request module 230 receives an account creation request including a user identifier, the endpoint request module 230 may query the accounts database to 136 to determine whether an account associated with the user identifier already exists. If so, the endpoint request module 230 may respond to the request indicating a failure. If not, the endpoint request module 230 may process request (in coordination with the service application 138 of FIG. 1 and other components), and respond with an indication of success. The endpoint request module 230 may also receive and respond to requests from the account information discovery script 116. As described above, the account information discovery script 116 may be a malicious application that issues repeated requests to endpoints in an attempt to determine which (if any) credentials in a list are valid credentials for the service provider, or which user identifiers on a list are associated with accounts at the service provider. The script 116 may be a standalone application or may run within the UI application 112 (e.g., as a script within the browser). The endpoint request module may also interact with the rate limit manager 236 to enforce rate limits defined by the rate limit manager 236. For example, if the rate limit manager establishes a request rate limit defining the maximum number of requests allowed from a network identifier 114, the endpoint request module 230 may block any further requests originating from a network identifier 114 that has met or exceeded the request rate limit. Similarly, the endpoint request module 230 may flag network identifiers 114 that exceed a flag rate limit established by the rate limit manager defining the number of requests allowed from a network identifier 114 before the network identifier 114 is flagged. If the flag rate limit is exceeded a number of times (the flag limit) determined by the rate limit manager 236, the endpoint request module 230 may block further requests from the network identifier 114. The endpoint request module 230 may block the further requests for a period of time (the block period) determined by the rate limit manager 236.

The request log manager 232 may log all requests received at the endpoint request module 230. For example, the endpoint request module 230 may direct the request log manager 232 to record an entry in a log each time a request is received. Each entry may contain fields for a time stamp, a network identifier 114 (e.g., an IP address), a user identifier, and an endpoint. The request log manager 232 may maintain separate logs for each endpoint, or a log shared by multiple endpoints.

The account risk detection module 234 may interact with the request log manager 232 and the pre-identified user identifier database 240 to identify activities that may indicate an account information discovery script 116 is issuing requests to the service provider. The account risk detection module 234 may periodically (e.g., every minute) extract from the logs at the request log manager 232 (or request from the request log manager 232) the user identifiers associated with every request made to the endpoint request module 230 during a time interval (e.g., the preceding 10 minutes) and group them by endpoint. The account risk detection module 234 may use a regular expression to extract the user identifiers (e.g., e-mail addresses published from a security breach) from the logs. The account risk detection module 234 may then search the pre-identified user identifier database for the extracted user identifiers. If a certain number or percentage of the extracted user identifiers match user identifiers in the pre-identified user identifier database 240 (suggesting that an account information discovery script 116 may be sending requests), the account risk detection module 234 may interact with the rate limit manager 236 to reduce the request rate limit. The request rate limit may be reduced for requests originating from any network identifier 114 which issued a request containing a pre-identified user identifier, for requests from any network identifier 114 which issues requests containing a pre-identified user identifier for a period of time after the threshold has been met or exceeded, and/or for all requests to an endpoint regardless of the network identifier 114 used to send the request. In addition to or instead of reducing the request rate limit, the account risk detection module 234 and the rate limit manager 236 may increase the period of time for which requests from a network identifier 114 are blocked in response to the threshold being met or exceeded.

In some embodiments, the rate limit manager 236 may establish and adjust rate limits and rate limit durations for requests to different endpoints. For example, the rate limit manager 236 may establish a request rate limit defining the number of requests allowed from a network identifier 114 over a period of time before further requests from the network identifier 114 are blocked. The rate limit manager 236 may also establish a flag rate limit, defining the number of requests allowed from a network identifier 114 over a period of time before the network identifier 114 is flagged. The flag rate limit may be lower than the request rate limit. Along with the flag rate limit, the rate limit manager 236 may also establish a flag limit, defining the number of times a network identifier 114 may be flagged before being blocked. The rate limit manager 236 may also define various block periods, i.e., how long requests from a network identifier 114 are blocked. In coordination with the endpoint request module 230 and the account risk detection module 234, the rate limit manager 236 may adjust the request rate limit, the flag rate limit, and the flag limit. The rate limit manager 236 may also adjust the period of time a rate limit or flag rate limit is in effect for. For example, to make the request rate limit harder to determine for an attacker, the rate limit manager 236 may randomly select a new request rate limit (e.g., between an upper and lower bound) periodically. The rate limit manager 236 may also vary the duration of the period a newly selected request rate limit is in effect for.

In some embodiments, the security breach data engine 160 may process databases or other collections of user credentials published online as a result of a security breach, extract any user identifiers (e.g., e-mail addresses or usernames) from the database, and store them in the pre-identified user identifier database 240. The security breach data engine 160 may periodically update the stored user identifiers. For example, a new collection of potentially compromised credentials may be provided to the security breach data engine 160 by a human operator 190, or the security breach data engine may be configured to locate and attempt to parse credentials published as part of a security breach (e.g., by monitoring sites known to publish data breaches).

Figure 3:
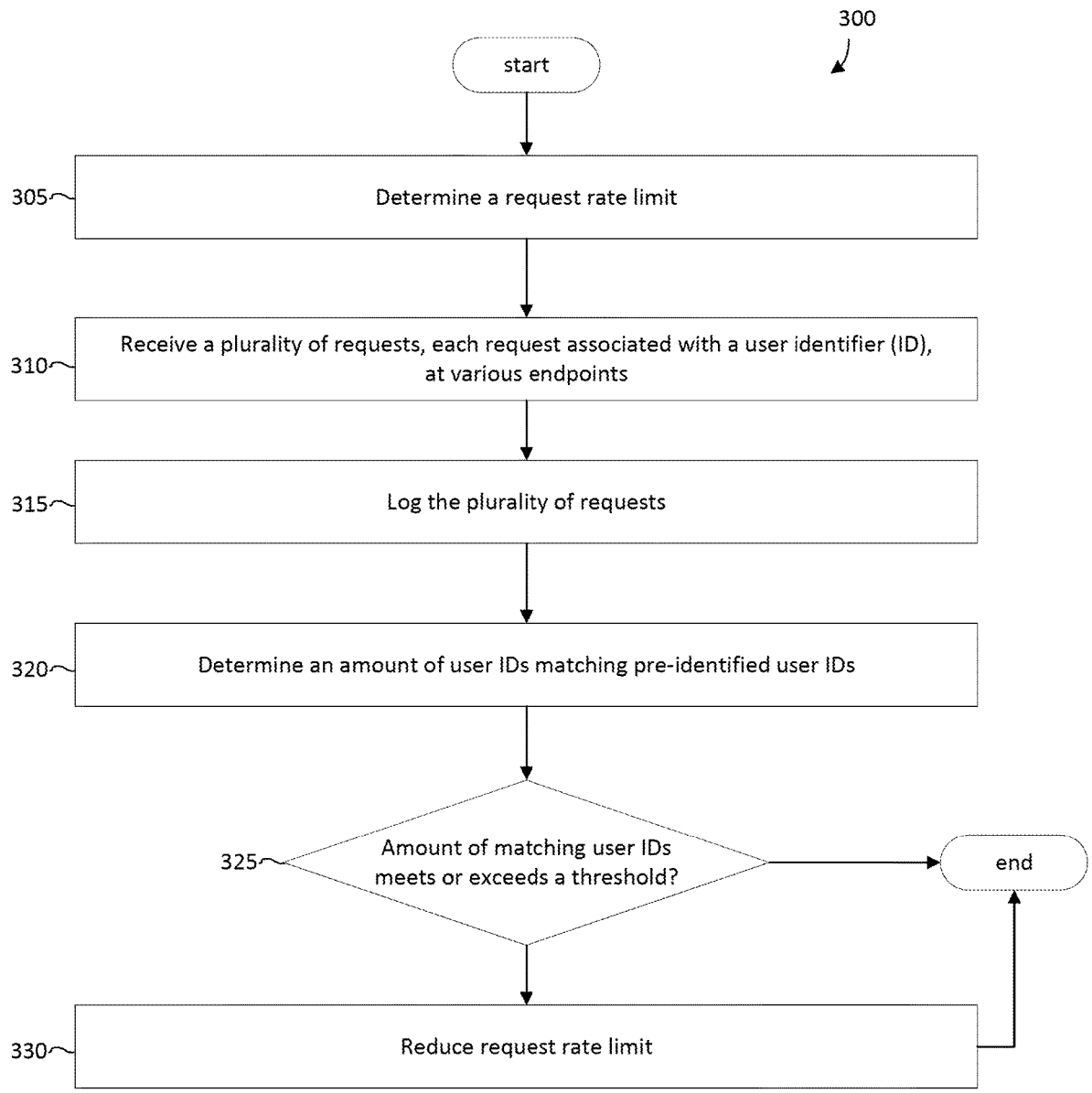
FIG. 3 is a flowchart showing a process of dynamically adjusting a request rate limit according to an embodiment of the present disclosure.

FIG. 3 illustrates a process 300 for dynamically adjusting a request rate limit according to various embodiments of the disclosure. In some embodiments, the process may be performed by an account security module 132. Note that the steps described below with respect to FIGS. 3-6 are also described above and can be performed in a different order, combined, or omitted as appropriate in different embodiments. The process 300 begins at step 305 by determining a request rate limit defining the number of requests that may be received at an endpoint (e.g., from an IP address) over a period of time before further requests to the endpoint are blocked. For example, the process may use the rate limit manager 236 to determine the request rate limit. The process 300 may determine different request rate limits for different endpoints.

At step 310, the process 300 receives a plurality of requests at various endpoints during a time interval. For example, each request may originate at a user device 110 and be received by the endpoint request module 230. Some requests may originate from a UI application (e.g., a web browser) as a user 140 attempts to access services at the service provider server 300. In some instances, the user 140 may be associated with an account at the service provider and may have conducted one or more electronic transactions with the service provider server 130 using the account. In some instances, the user 140 may be a malicious actor, and requests may be scripted so that they originate from the account information discovery script 116 on the user device 110. Each request may be associated with a user identifier (e.g., an e-mail address). The user identifier may correspond with an account at the service provider (e.g., stored in the accounts database 136) for which information is sought. For example, if the user 140 is a malicious actor, a request may be sent to an endpoint for creating an account, and the user identifier may be an e-mail address the malicious actor is trying to validate as having an account with the service provider. Similarly, requests may be sent to an account login endpoint to validate e-mail addresses or attempt to gain access to a user account. Each request may be transmitted from an IP address (i.e., the network identifier 114).

At step 315, the process 300 logs each request received during the time interval in one or more log files. For example, the request log manager 232 may log each request. In some embodiments, each endpoint may have its own log file (e.g., a log file for the account creation endpoint and a log file for the login endpoint), or a single log file may be used for all endpoints. Each request may be logged in an entry containing a timestamp indicating when the request was received, the IP address from which the request originated, the user identifier associated with the request, and the endpoint at which the request was received (e.g., if a single log file is used for all endpoints).

At step 320, the process 300 determines the amount (e.g., the number or percentage) of user identifiers associated with the plurality of requests received during the time interval that correspond to pre-identified user identifiers. The pre-identified user identifiers may include e-mail addresses that have been collected from security breaches at various websites, or that may otherwise indicate suspicious activity (e.g., based on past activity with the service provider). For example, hackers may gain access to an account database at a website storing login credentials and leak the database (or user account information obtained from the database) on the internet. The pre-identified user identifiers may be extracted from the leaked databases and stored (e.g., in the pre-identified user identifier database 240) with an indication of which security breach (or breaches, if the e-mail address was leaked during multiple breaches) the e-mail address was obtained from. The request log manager 232 may interact with the account risk detection module 234 to extract every user identifier (e.g., using a regular expression designed to match e-mail addresses) associated with a request logged during the time interval. The extracted user identifiers may then be grouped by the endpoint at which their associated request was received, and the account risk detection module 234 may search the pre-identified user identifier database 240 to determine for every endpoint the amount of extracted user identifiers that match pre-identified user identifiers associated with each security breach. For example, a security breach at an online discussion forum may have resulted in the publication of a list of 1,000 of e-mail addresses and passwords, and a security breach at an online retailer may have resulted in the publication of a list of 5,000 of e-mail addresses and passwords. The 1,000 e-mail addresses from the discussion forum breach may be stored in the pre-identified user identifier database 240 along with an indication that they were obtained from the discussion forum breach. Similarly, the 5,0000 e-mail addresses from the retailer breach may also be stored in the pre-identified user identifier database 240 along with an indication that they were obtained from the retailer breach. The pre-identified user identifier database 240 may also be populated with e-mail addresses from any number of other breaches. The account risk detection module 234 may search the pre-identified user identifier database 240 for each of the user identifiers extracted from the request log(s) and determine the amount of those received at each endpoint during the time interval that match pre-identified user identifiers from each breach. For example, the account risk detection module 234 may determine that during the interval (e.g., 10 minutes) the account creation endpoint received requests including 30 e-mail addresses of the 1,000 (i.e., 3%) present in the discussion forum breach, and 200 e-mail addresses of the 5,000 (i.e., 4%) in present in the retailer breach. The account risk detection module 234 may also determine that the account login endpoint received requests including 60 e-mail addresses of the 1,000 (i.e., 6%) present in the discussion forum breach, and 50 e-mail addresses of the 5,000 (i.e., 1%) in present in the retailer breach.

At step 325, the process 300 determines if the amount of matching user identifiers meets or exceeds a threshold. For example, the account risk detection module 234 may compare the amount of matching user identifiers to a threshold configured at the account risk detection module 234. The threshold may be defined in terms of a number of matching user identifiers from a breach (e.g., 20 user identifiers from a single breach), or the percentage of user identifiers from a specific breach that match the extracted user identifiers (e.g., 5% of the user identifiers from a single breach). Continuing the example above, the threshold may be set to 5%, indicating that the threshold will be met for an endpoint if 5% of the e-mail addresses from a specific breach were included in requests received at the endpoint during the 10-minute interval. The e-mail addresses included in requests to the account creation endpoint amounted to 3% of the e-mail addresses from the discussion forum breach, and 4% of the e-mail addresses from the retailer breach. Thus, the 5% threshold would not be met for the account creation endpoint in those instances. But the e-mail addresses included in requests to the account login endpoint amounted to 6% of the e-mail addresses from the discussion forum breach, and 1% of e-mail addresses in the retailer breach. Thus, the 5% threshold would be met for the account login endpoint because requests received at the endpoint included 6% of the e-mail addresses from the discussion forum breach. In some instances, the amount of matching identifiers may be computed across multiple endpoints. For example, the account risk detection module 234 may combine the requests from both the account creation endpoint and the account login endpoint and determine if the e-mail addresses included in those requests amount to 5% or more of a single breach list. The threshold may also be defined in terms of all pre-identified user identifiers, not only those obtained from a single breach. For example, the account risk detection module 234 may determine if the e-mail addresses received at an endpoint (or at multiple endpoints) amount to 5% or more of all the e-mail addresses obtained from all breaches. If the amount of matching user identifiers meets or exceeds the threshold, it may suggest that an account discovery script 116 is working through a list of accounts that have been potentially compromised elsewhere. Accordingly, the process may proceed to step 330 to reduce the effectiveness of the attack. If the amount does not meet or exceed the threshold, the process 300 may end for the current time interval. The process may begin again for a new time interval, and the account risk detection module 234 may determine whether the threshold has been exceeded on rolling basis (e.g., every minute, considering requests received during the previous 10 minutes).

At step 330, in response to determining that the amount of matching user identifiers meets or exceeds the threshold, the process 300 may reduce the request rate limit. Reducing the request rate limit may stop or at least slow down an attack against the service provider, as the account discovery script 116 would be able to send fewer requests to the service provider server 130 before being blocked. For example, the suspicious request detection manager 232 may communicate with the rate limit manager 236 to have the rate limit manager 236 reduce the request rate limit. The rate limit manager 236 may then communicate the reduced request rate limit to the endpoint request module 230, which may enforce the reduced limit. In some embodiments, the request rate limit may be reduced for any IP address from which a request associated with a pre-identified user identifier originated. The request rate limit may also be reduced for any IP address that sends a request to an endpoint for a period of time after the threshold has been met or exceeded. The request rate limit may also be reduced for all requests to an endpoint (regardless of IP address) at which a request associated with a pre-identified user identifier was received. Additionally (or instead), further requests from those IP addresses may be blocked for a period of time (the block period). In some embodiments, the block period may be increased in response to determining that the threshold has been met or exceeded.

Figure 4:
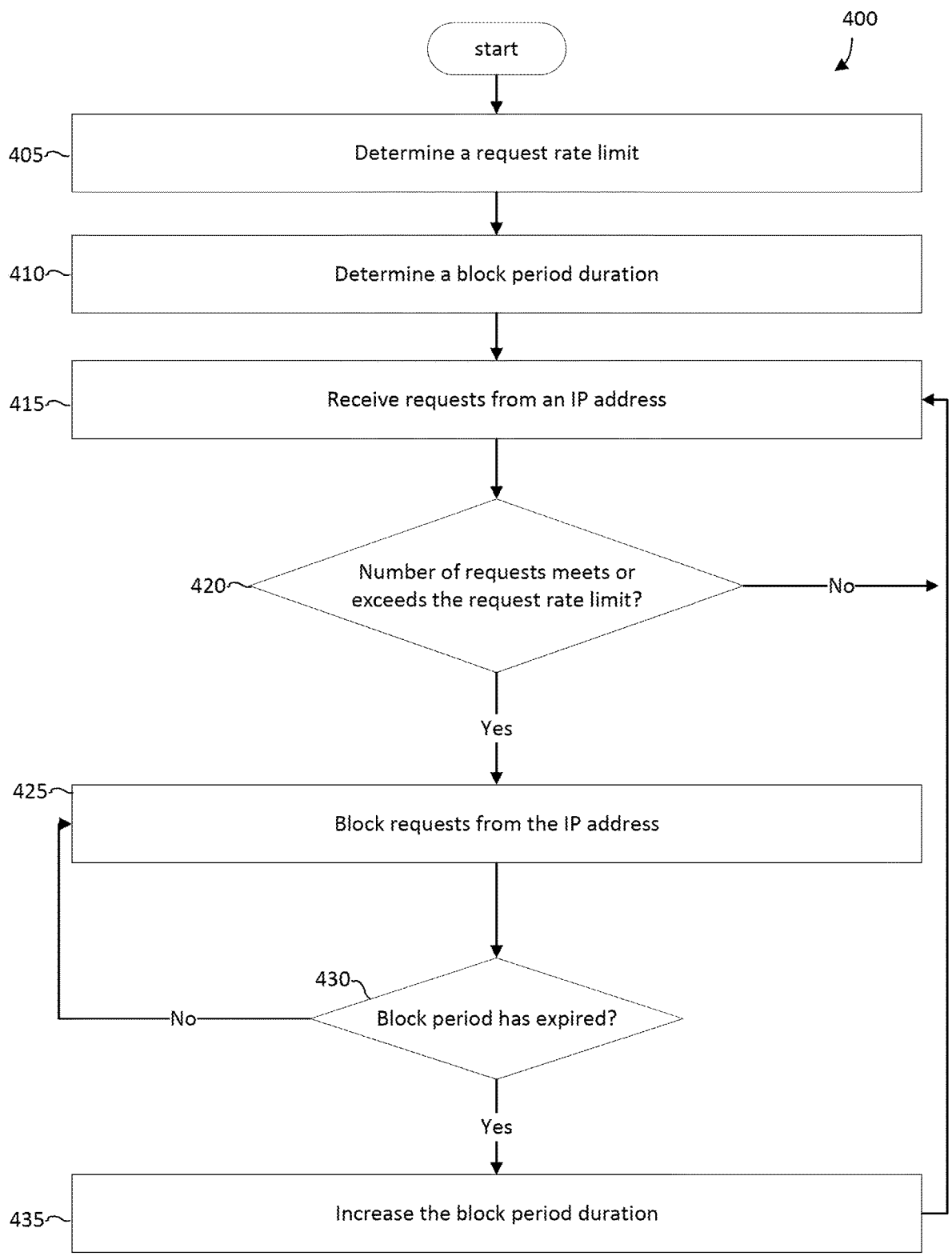
FIG. 4 is a flowchart showing a process of determining block-period durations for block periods applied to an IP address according to an embodiment of the present disclosure.

FIG. 4 illustrates a process 400 for determining block-period durations for block periods applied to an IP address according to various embodiments of the disclosure. The process 400 may reduce the effectiveness of an automated attack against a service provider by increasing the period of time an attacker remains blocked every time the attacker is blocked for meeting or exceeding a request rate limit. In some embodiments, the process may be performed by an account security module 132. The process 400 begins at step 405 by determining a request rate limit, defining the number of requests that may be received at an endpoint (e.g., from the IP address) before further requests to the endpoint are blocked. For example, the process may use the rate limit manager 236 to determine the rate limit. The process 300 may determine different request rate limits for different endpoints.

At step 410, the process determines a block period duration—how long requests from an IP address (i.e., a network identifier 114) remain blocked after requests from the IP address are blocked. For example, the rate limit manager 236 may determine the block period. At the expiration of the block period, requests originating at the IP address may again be allowed (e.g., by the endpoint request module).

At step 415, the process 400 receives requests from the IP address. For example, each request may originate at a user device 110 associated with the IP address and be received by the endpoint request module 230. In some instances, the device 110 may be under the control of a user 140 who is be a malicious actor, and requests may be scripted so that they originate from an account information discovery script 116 on the user device 110.

At step 420, the process 400 may determine whether the number of requests originating at the IP address over a time interval meets or exceeds the request rate limit. For example, the endpoint request module 230 may compare the number of requests received from the IP address during the time interval to the request rate limit. If the number of requests has not met or exceeded the request rate limit, the process returns to step 415, where it may continue receiving requests from the IP address. If the number of requests has exceeded the request rate limit, the process proceeds to step 425. In some embodiments, the process 400 may reset the block period duration to its initial value (as determined in step 410) after a period of time (the rate reset period) has elapsed where requests originating at the IP address have not met or exceeded the rate limit.

At step 425, the process may block all requests originating at the IP address for the duration of the block period. For example, the endpoint request module 230 may respond to any requests received from the IP address during the block period with a status code indicating an error (e.g., status code 429, indicating that too many requests have been sent from the IP address, or 403, indicating that access is forbidden).

At step 430, the process 400 may determine whether the block period has expired. For example, the endpoint request manager 230 may compare the time requests from the IP address were first blocked to the current time. If the block period has not expired, the process 400 may return to step 425 and continue blocking requests from the IP address. If the block period has expired, the method may proceed to block 435.

At block 435, the process 400 may increase the duration of the block period for which requests from the IP address will be blocked if the request rate limit is again exceeded. For example, the rate limit manager 236 may increase the block period by a fixed amount, or it may increase the block period exponentially. For example, if the duration of the initial block period determined at step 410 is 10 minutes, the block period may be increased by 2 minutes (a fixed amount), so that the second time the IP address is blocked, the block period lasts for 12 minutes, the third time the IP address is blocked, the block period lasts for 14 minutes, the fourth time the address is blocked, the block period lasts for 16 minutes, and so on. Alternately the block period may be increased by a percentage of the block period each time. For example, the block period may be increased by 20% each time so that if the initial block period lasts 10 minutes, the second block period lasts 12 minutes, the third block period lasts 14.4 minutes, the fourth block period lasts 17.28 minutes, and so on. Once the block period has been increased, the method returns to step 415 where requests originating from the IP address may again be processed. If the rate limit is again exceeded, the increased block period will apply, and the block period will be increased for the next (potential) block period. In some embodiments, the process 400 may also increase the rate reset period when it increases the duration of the next block period. As with the block period duration, the process 400 may increase the rate period duration by a fixed amount or exponentially.

Figure 5:
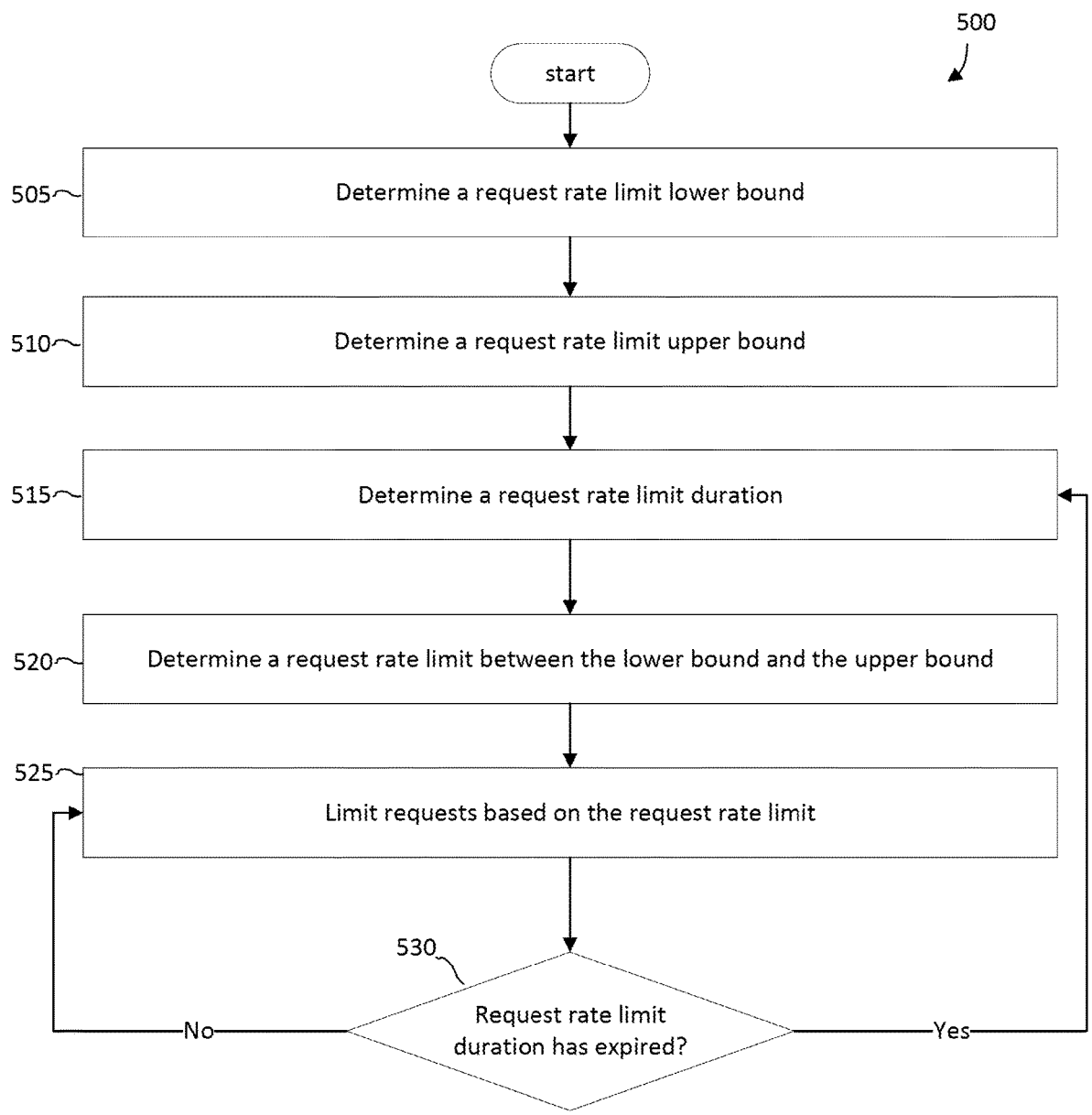
FIG. 5 is a flowchart showing a process of determining rate limit values and durations according to an embodiment of the present disclosure.

FIG. 5 illustrates a process 500 for determining rate limit values and durations according to various embodiments of the disclosure. The process 500 may make it difficult for an attacker to optimize the number of requests transmitted by an attack script over a period of time by making a request rate limit at a service provider harder to discover. In some embodiments, the process may be performed by an account security module 132. The process 500 begins at step 505, where it determines a lower bound for a request rate limit, and continues to step 510, where it determines an upper bound for the request rate limit. For example, the rate limit manager 236 may determine the lower and upper bounds. In some embodiments, the lower and upper bounds may be capped to a variance of a specific request rate limit. For example, for an initial request rate limit of 50 requests/minute and a variance of 20%, the lower bound would be 45 requests/minute and the upper bound would be 55 requests/minute.

At step 515, the method 500 determines a request rate limit duration. The duration defines how long a specific request rate limit will be applied. In some embodiments, a lower and upper bound for the request rate limit duration may be selected, as described with respect to the lower and upper bounds for the request rate limit above. The duration of the request rate limit, and the lower and upper bounds, may be determined by the rate limit manager 236.

At step 520, the method determines a request rate limit between the upper and lower request rate bounds. The request rate limit may be selected randomly between the upper and lower bounds. For example, the rate limit manager may determine a lower bound of 45 requests/minute and an upper bound for 55 requests/minute as described in steps 505 and 510. The rate limit manager 236 may then randomly select any value for the request rate limit between the lower and upper request rate limit bounds, resulting in a binomial distribution of selected request rate limits between 45 requests/minute and 55 requests/minute.

At step 525, the process 500 may limit requests based on the request rate limit. For example, the rate limit manager 236 may coordinate with the endpoint request module 230 to limit requests from an IP address (i.e., a network identifier 114) associated with a user device 110 at the rate indicated by the request rate limit. The requests may originate from an account information discovery script 116. If the number of requests from the IP address meets or exceeds the request rate limit, the endpoint request module 230 may block further requests from the IP address.

At step 530, the process 500 may determine whether the request rate limit duration has expired (e.g., using the rate limit manager 236). If not, the process may return to step 525 and continue limiting requests based on the request rate limit. If the rate limit duration has expired, the process may return to step 515 where a new rate limit duration may be selected at random (e.g., between the upper and lower rate limit duration bounds), and continue to step 520 where a new request rate limit may be randomly selected between the upper and lower request rate limit bounds.

Figure 6:
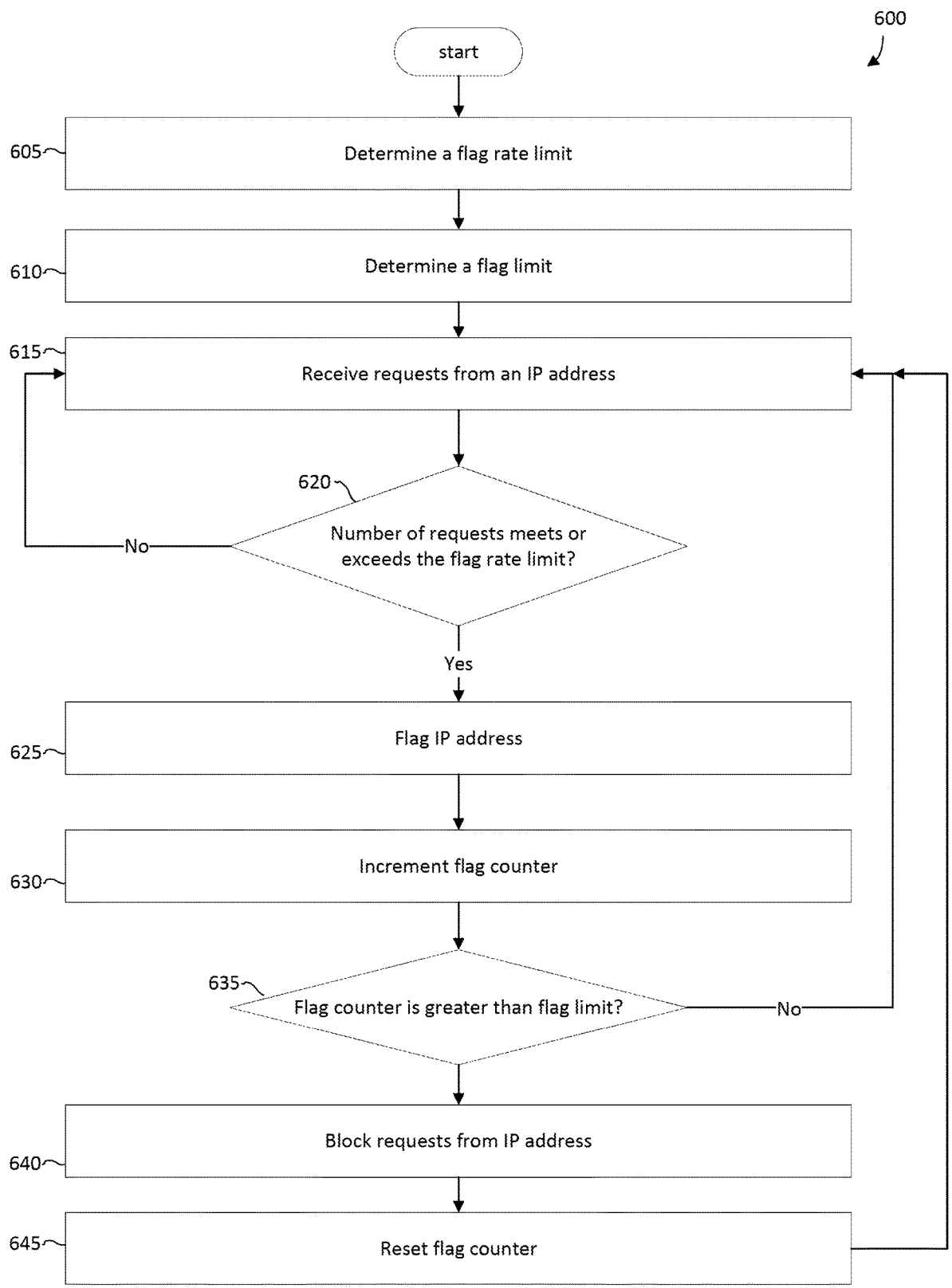
FIG. 6 is a flowchart showing a process of flagging and blocking a user for meeting or exceeding a request rate limit according to an embodiment of the present disclosure.

FIG. 6 illustrates a process 600 for flagging and blocking a user for meeting or exceeding a request rate limit according to an embodiment of the present disclosure. The process 600 may enable the blocking of requests from a user device 110 controlled by a user 150 (i.e., a malicious actor) when the rate at which the device transmits the requests has been configured to be below the request rate limit. In some embodiments, the process may be performed by an account security module 132. The process 600 begins at step 605, where the process determines a flag rate limit. The flag rate limit may be lower than the request rate limit and may define the number of attempts over a time interval at or over which an IP address may flagged. Flagging an IP address may not immediately result in the IP address being blocked, but flagging the IP address may identify it as a potential source of abuse for later action (e.g., blocking). The flag rate limit may be determined, for example, by the rate limit manager 236.

At step 610, the process may determine a flag limit. The flag limit may define the number of times an IP address may exceed the flag rate limit in a period of time before action (e.g., blocking) is taken against the IP address. For example, the rate limit manager 236 may establish a request rate limit of 6 requests/minute, a flag rate limit of 3 requests/minute, and a flag limit of 5 flags per 10-minute period. If the endpoint request manager 230 receives 3 requests in one minute from an IP address, the endpoint request manager 230 may flag the IP address. If the IP address is flagged an additional 4 times within the next 9 minutes (i.e., 5 times in a ten-minute period), the IP address will have met the flag rate limit and may be blocked as described below.

At step 615, the process may receive a plurality of requests from an IP address. For example, an account information discovery script 116 on a user device 110 may transmit from an IP address (i.e., a network identifier 114) a plurality of requests, which may be received by the endpoint request module 230. The requests may be designed to discover user account information from the service provider, and the account information discovery script 116 may have been programmed by a user 140 (a malicious actor in this case) to not exceed a request rate limit (which the user 140 may have determined or approximated).

At step 620, the process determines (e.g., using the endpoint request module 230) whether the number of requests received from the IP address over the time interval has met or exceeded the flag rate limit. If the number of requests over the time interval has not exceeded the flag rate limit, the process may return to step 615, where it may continue receiving requests from the IP address. Otherwise, the method proceeds to step 625.

At step 625, the process 600 may flag the IP address in response to the number of requests from the IP address exceeding the flag rate limit, and at step 630, the process will increment a flag counter. The flag counter may keep track of the number of times the IP address has exceeded the flag rate limit. For example, the endpoint request module 230 may determine that the IP address has exceeded the flag rate limit and increment the flag counter.

At step 635, the process will determine whether the number of times the IP address has been flagged meets or exceeds the flag limit. For example, the endpoint request module 230 may compare the flag counter to the flag limit to determine if the flag limit has been met or exceeded. If the number of times the IP address has been flagged has not exceeded the flag limit, the process may return to step 615 and continue receiving requests from the IP address. If flag limit has been met or exceeded, the process will proceed to step 640.

At step 640, the process may block requests from the IP address for a period of time in response to determining that the flag limit was met or exceeded. For example, the endpoint request module 230 may respond to any requests received from the IP address during the block period with a status code indicating an error (e.g., status code 429, indicating that too many requests have been sent from the IP address, or 403, indicating that access is forbidden). In some embodiments, the endpoint request module 230 may transmit a challenge (e.g., a CAPTCHA or other puzzle) to the IP address and only block requests from the IP address if the endpoint request module 230 does not receive a correct solution to the challenge.

At step 645, the process may reset the flag counter, and the process may return to step 615 and continue receiving requests from the IP address. For example, once the block period has expired, the endpoint request module 230 may reset the flag counter and begin accepting requests from the IP address again. The IP address may subsequently be flagged and blocked again any number of times as described above.

Figure 7:
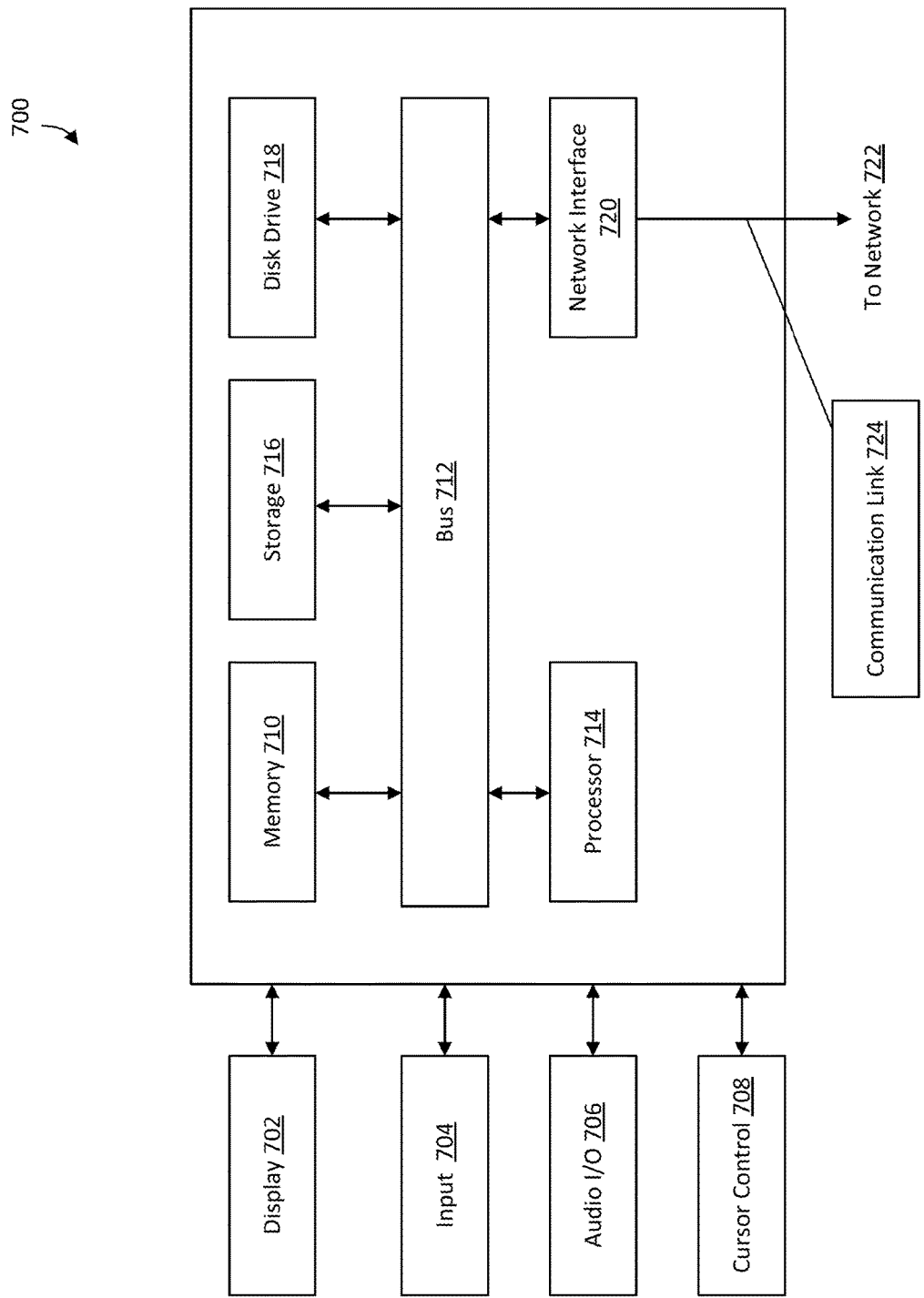
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130 and the user device 110. In various implementations, the user device 110 may include a mobile cellular phone, personal computer (PC), laptop, wearable computing device, etc. adapted for wireless communication, and the service provider server 130 may include a network computing device, such as a server. Thus, it should be appreciated that the devices 110 and 130 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. For example, the network interface 720 may transmit or receive requests from the account information discovery script 116. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the account security functionalities described herein according to processes 300, 400, 500, and 600.

Logic may be encoded in a computer readable medium, which may refer to any medium that participates in providing instructions to the processor 914 for execution. Such a medium may take many forms, including but not limited to, non-volatile media, volatile media, and transmission media. In various implementations, non-volatile media includes optical or magnetic disks, volatile media includes dynamic memory, such as the system memory component 910, and transmission media includes coaxial cables, copper wire, and fiber optics, including wires that comprise the bus 912.

In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 900. In various other embodiments of the present disclosure, a plurality of computer systems 900 coupled by the communication link 924 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:
1. A system, comprising:
a non-transitory memory; and
one or more hardware processors coupled with the non-transitory memory and configured to read instructions from the non-transitory memory to cause the system to perform operations comprising:
receiving, at one or more endpoints during a time interval, a plurality of requests, each request from the plurality of requests associated with a user identifier;
logging, in one or more log files, each request;
determining an amount of one or more user identifiers associated with the plurality of requests received during the time interval that corresponds to one or more pre-identified user identifiers of a plurality of pre-identified user identifiers;
determining that the amount of the one or more user identifiers meets or exceeds a threshold; and
reducing, in response to the determining that the amount of the one or more user identifiers meets or exceeds the threshold, a request rate limit from a predefined first value to a randomized second value that is greater than 0.

2. The system of claim 1, wherein the determining the amount of one or more user identifiers comprises:
extracting, from the one or more log files, each user identifier based on a regular expression;
grouping each extracted user identifier by an endpoint of the one or more endpoints at which the request associated with the extracted user identifier occurred; and
searching the plurality of pre-identified user identifiers for each extracted user identifier.

3. The system of claim 1, wherein the request rate limit is for an endpoint of the one or more endpoints at which a request was received.

4. The system of claim 1, wherein the request rate limit is for an IP address, and wherein the reducing comprises:
determining that a request associated with a user identifier in the plurality of pre-identified user identifiers originated from the IP address.

5. The system of claim 1, wherein each of the one or more user identifiers comprises an e-mail address.

6. The system of claim 1, wherein the plurality of pre-identified user identifiers is identified based on the pre-identified user identifiers corresponding to a data breach associated with one or more entities.

7. The system of claim 1, wherein the operations further comprise:
determining that a number of requests originating from an IP address have met or exceeded the request rate limit; and
blocking, in response to determining that the requests from the IP address have met or exceeded the request rate limit, the IP address.

8. A method, comprising:
determining, by one or more hardware processors, a request rate limit defining a number of requests permitted over a period of time;
obtaining, by the one or more hardware processors at one or more endpoints during a time interval, a plurality of requests, each request from the plurality of requests associated with a user identifier;
determining, by the one or more hardware processors, that an amount of one or more of the user identifiers obtained during the time interval corresponding to one or more pre-identified user identifiers of a plurality of pre-identified user identifiers meets or exceeds a threshold; and
reducing, in response to the determining that the amount of the one or more of the user identifiers meets or exceeds the threshold, the request rate limit to a randomized non-zero value.

9. The method of claim 8, further comprising:
instituting, in response to a number of requests originating at an IP address meeting or exceeding the request rate limit, a first block disallowing further requests from the IP address for a duration of a first block period; and
removing the first block after the first block period has elapsed.

10. The method of claim 9, further comprising:
instituting, in response to a number of further requests originating at the IP address again meeting or exceeding the request rate limit, a second block disallowing further requests from the IP address for a second block period, wherein the second block period is longer than the first block period.

11. The method of claim 8, wherein the determining the request rate limit comprises:
establishing an upper bound defining a maximum allowable value for the request rate limit;
establishing a lower bound defining a minimum allowable value for the request rate limit; and
randomly selecting a first value for the request rate limit between the upper bound and the lower bound, wherein the first value is greater than the randomized non-zero value.

12. The method of claim 11, further comprising:
determining, after a first rate limit duration, a second value for the request rate limit between the upper bound and the lower bound, the second value being different from the first value.

13. The method of claim 8, wherein the threshold comprises a predefined percentage of user identifiers from a breached database.

14. The method of claim 8, further comprising:
transmitting, in response to a number of requests originating from an IP address meeting or exceeding the request rate limit, a challenge to a device associated with the IP address;
receiving a response to the challenge from the device;
determining a validity of the response; and
blocking, in response to determining the response is not valid, further requests originating from the IP address.

15. A non-transitory machine-readable medium having stored thereon machine-readable instructions executable to cause a machine to perform operations comprising:
receiving, at one or more endpoints during a time interval, a plurality of requests, each request associated with an e-mail address;
logging, in one or more log files, each e-mail address associated with each request of the plurality of requests;
determining that an amount of one or more of the e-mail addresses logged during the time interval corresponding to one or more pre-identified e-mail addresses of a plurality of pre-identified e-mail addresses meets or exceeds a threshold; and
increasing, in response to the determining that the amount of the one or more of the e-mail addresses meets or exceeds the threshold, a duration of a block period associated with a request rate limit, wherein the duration of the block period is increased from a predefined first value to a randomized second value.

16. The non-transitory machine-readable medium of claim 15, wherein the operations further comprise:
blocking, for the duration of the block period, further requests from an IP address in response to a number of requests originating from the IP address meeting or exceeding the request rate limit.

17. The non-transitory machine-readable medium of claim 15, wherein the operations further comprise:
   determining that a number of requests from an IP address over a time interval has met or exceeded a flag rate limit; and
   flagging, in response to the determining that the number of requests from the IP address has exceeded the flag rate limit, the IP address.

18. The non-transitory machine-readable medium of claim 17, wherein the flag rate limit is lower than the request rate limit.

19. The non-transitory machine-readable medium of claim 17, wherein the operations further comprise:
   determining for a first time that an IP address has been flagged a number of times greater than a flag limit; and
   blocking, in response to the determining for the first time that the IP address has been flagged a number of times greater than the flag limit, requests from the IP address for a first period of time.

20. The non-transitory machine-readable medium of claim 19, wherein the operations further comprise:
   determining for a second time that the IP address has been flagged a number of times greater than the flag limit; and
   blocking, in response to the determining for the second time that the IP address has been flagged a number of times greater than the flag limit, requests from the IP address for a second period of time, wherein the second period of time is greater than the first period of time.

\* \* \* \* \*